United States Patent
Ooms et al.

(10) Patent No.: US 12,259,001 B2
(45) Date of Patent: Mar. 25, 2025

(54) NON-CIRCULAR SLIDING SURFACE

(71) Applicants: ZF FRIEDRICHSHAFEN AG, Friedrichshafen (DE); ZF Wind Power Antwerpen N.V., Lommel (BE)

(72) Inventors: Maarten Ooms, Geel (BE); Koen Krieckemans, Noorderwijk (BE); Michel Goovaerts, Hulshout (BE); Dennis Witter, Friedrichshafen (DE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 19 days.

(21) Appl. No.: 18/245,726

(22) PCT Filed: Sep. 15, 2021

(86) PCT No.: PCT/EP2021/075262
§ 371 (c)(1),
(2) Date: Mar. 17, 2023

(87) PCT Pub. No.: WO2022/073730
PCT Pub. Date: Apr. 14, 2022

(65) Prior Publication Data
US 2023/0358274 A1    Nov. 9, 2023

(30) Foreign Application Priority Data

Oct. 6, 2020    (DE) .................... 10 2020 212 572.4

(51) Int. Cl.
*F16C 17/02*    (2006.01)
*F16C 33/06*    (2006.01)
(Continued)

(52) U.S. Cl.
CPC .............. *F16C 17/02* (2013.01); *F16C 33/06* (2013.01); *F16C 33/14* (2013.01);
(Continued)

(58) Field of Classification Search
CPC ...... F16C 17/02; F16C 33/06; F16C 2361/61; F16C 33/14; F16C 2220/62; F16H 1/28; F16H 2057/085
See application file for complete search history.

(56) References Cited

U.S. PATENT DOCUMENTS 3,218,765 A    11/1965    Volk
5,434,695 A    7/1995    Saito et al.
(Continued)

FOREIGN PATENT DOCUMENTS

DE    890284 C    9/1953
DE    1677166 A    3/1970
(Continued)

OTHER PUBLICATIONS

Ellipse_Machinerys_Handbook_29th_Edition (Year: 2012).*
(Continued)

*Primary Examiner* — Phillip A Johnson
(74) *Attorney, Agent, or Firm* — LEYDIG, VOIT & MAYER, LTD.

(57) ABSTRACT

An inner sliding surface for a radial plain bearing, including four circle arcs in at least one cross section. A first arc and a second arc of the four circle arcs lie on different sides of a longitudinal sectional plane which intersects a third arc of the four circle arcs, a fourth arc of the four circle arcs and a common center point of the third arc and the fourth arc. The first arc and a center point of the first arc lie on different sides of the longitudinal sectional plane, and the second arc
(Continued)

and a center point of the second arc lie on different sides of the longitudinal sectional plane.

8 Claims, 1 Drawing Sheet

(51) Int. Cl.
 *F16C 33/14* (2006.01)
 *F16H 57/08* (2006.01)
(52) U.S. Cl.
 CPC ...... *F16C 2220/62* (2013.01); *F16C 2361/61* (2013.01); *F16H 2057/085* (2013.01)

(56) References Cited

U.S. PATENT DOCUMENTS

| | | | | |
|---|---|---|---|---|
| 8,657,714 | B1* | 2/2014 | Ghanime | F16C 33/1065 384/380 |
| 2002/0131657 | A1* | 9/2002 | Inoue | F16C 33/20 384/276 |
| 2013/0053202 | A1 | 2/2013 | Ghanime et al. | |
| 2013/0223776 | A1 | 8/2013 | Koushima et al. | |
| 2017/0152885 | A1 | 6/2017 | Kato et al. | |
| 2019/0309796 | A1 | 10/2019 | Haecker et al. | |
| 2020/0191256 | A1* | 6/2020 | Kontinen | F16H 57/0486 |

FOREIGN PATENT DOCUMENTS

| | | |
|---|---|---|
| DE | 3936069 A1 | 5/1991 |
| DE | 102006033397 A1 | 1/2008 |
| DE | 102011085712 A1 | 6/2012 |
| DE | 102013203128 A | 8/2013 |
| DE | 102016111757 B3 | 9/2017 |
| EP | 2489902 A1 | 8/2012 |

OTHER PUBLICATIONS

Volmer, Ovalturning, third edition, Aug. 2012, pp. 1-60, Chemnitz, Germany.
Wikipedia, Oval, Mar. 2023, page version ID 231756800, URL: https://de.wikipedia.org/wiki/Oval.

* cited by examiner

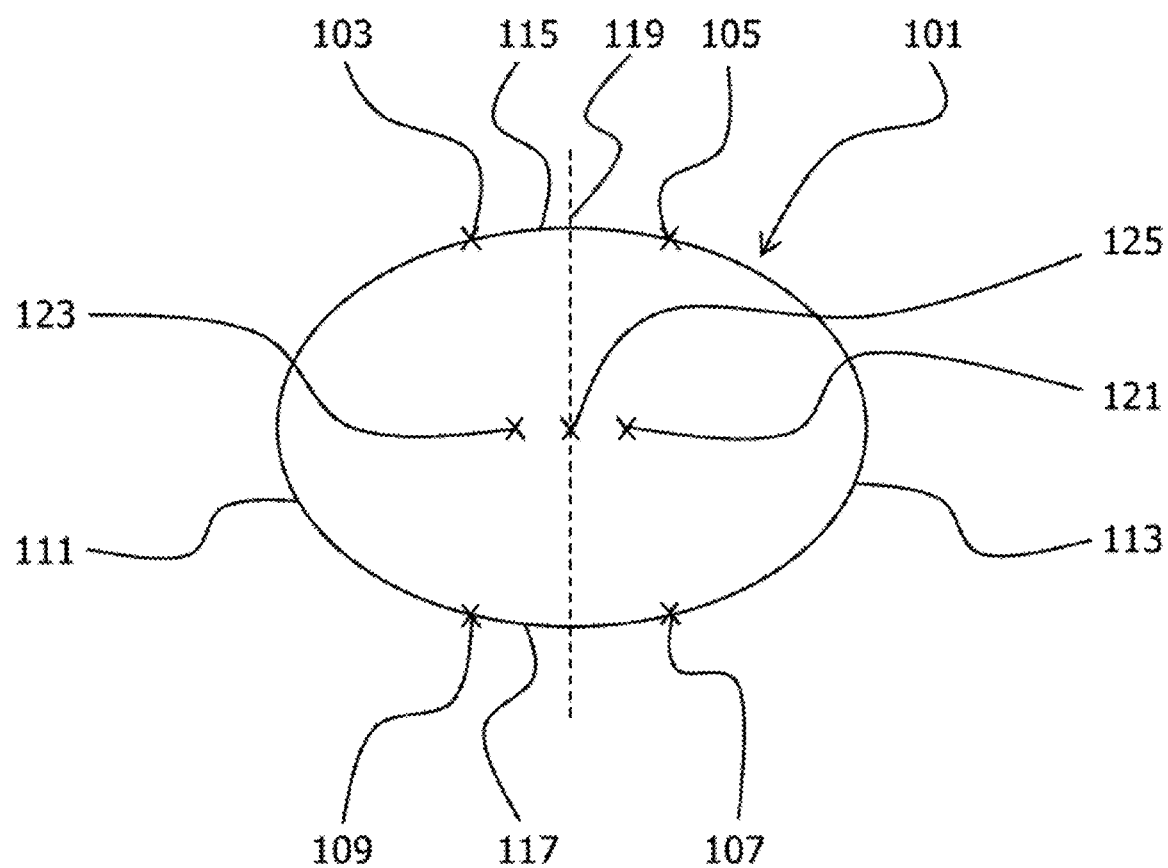

NON-CIRCULAR SLIDING SURFACE

CROSS REFERENCE TO RELATED APPLICATIONS

This application is a U.S. National Phase application under 35 U.S.C. § 371 of International Application No. PCT/EP2021/075262, filed on Sep. 15, 2021, and claims benefit to German Patent Application No. DE 10 2020 212 572.4 filed on Oct. 6, 2020. The International Application was published in German on Apr. 14, 2022 as WO 2022/073730 A1 under PCT Article 21(2).

FIELD

The invention concerns a sliding surface and a method for manufacturing a sliding surface.

BACKGROUND

A radial plain bearing is a plain bearing which has an outer sliding surface as well as the inner sliding surface. The two sliding surfaces are arranged such that they are able to transmit forces in the radial direction, i.e. orthogonally to a rotational axis of the radial plain bearing. The forces are transmitted between the inner sliding surface and the outer sliding surface.

In a purely radial plain bearing, it is not possible to transmit forces in the axial direction. In the case of a combined radial-axial plain bearing, forces can also be transmitted in the axial direction, i.e. in the direction of the rotational axis.

The inner sliding surface and the outer sliding surface are rotatable relative to one another about the above-mentioned rotational axis. They form a sliding surface pair. A sliding surface pair is distinguished in that its sliding surfaces form a bearing gap. This is dry or at least partially filled with a lubricant.

The outer sliding surface encases the inner sliding surface. At least one and preferably each vertical line starting from the outer sliding surface to the rotational axis intersects the inner sliding surface. Each distance of an arbitrary point of the outer sliding surface from the rotational axis is also greater than each distance of a point of the inner sliding surface therefrom.

In at least one cross section, the outer sliding surface forms a closed curve which encases a surface. Part of this surface is a curve, also closed in itself, formed by the inner sliding surface in this cross section. The at least one cross section is distinguished by a radial development. The corresponding sectional plane thus runs orthogonally to the rotational axis of the radial plain bearing.

In the at least one cross section, preferably in each cross section, the curve formed by the inner sliding surface consists of four circle arcs. The inner sliding surface thus consists of a first arc, a second arc, a third arc and a fourth arc. The arcs adjoin one another. Individually, the first arc adjoins the third arc and the fourth arc. The third arc adjoins the first arc and the second arc; the second arc adjoins the third arc and the fourth arc. The fourth arc finally adjoins the first arc and the second arc. The first arc and the third arc thus have a common corner point. Similarly, the third arc and the second arc, the second arc and the fourth arc, and the fourth arc each also have common corner points.

SUMMARY

In an embodiment, the present disclosure provides an inner sliding surface for a radial plain bearing, comprising four circle arcs in at least one cross section. A first arc and a second arc of the four circle arcs lie on different sides of a longitudinal sectional plane which intersects a third arc of the four circle arcs, a fourth arc of the four circle arcs and a common center point of the third arc and the fourth arc. The first arc and a center point of the first arc lie on different sides of the longitudinal sectional plane, and the second arc and a center point of the second arc lie on different sides of the longitudinal sectional plane.

BRIEF DESCRIPTION OF THE DRAWINGS

Subject matter of the present disclosure will be described in even greater detail below based on the exemplary FIGURES. All features described and/or illustrated herein can be used alone or combined in different combinations. The features and advantages of various embodiments will become apparent by reading the following detailed description with reference to the attached drawings, which illustrate the following:

FIG. 1 shows an inner sliding surface.

DETAILED DESCRIPTION

FIG. 1 shows a sectional illustration of an inner sliding surface.

The first arc and the second arc lie completely on different sides of a longitudinal sectional plane. The longitudinal sectional plane is distinguished by an axial course. It thus runs parallel to the rotational axis of the radial plain bearing. Preferably, the longitudinal sectional plane runs through the rotational axis, so that the rotational axis is completely contained in the longitudinal sectional plane.

The longitudinal sectional plane intersects the third arc and the fourth arc and a point which forms a center point of the third arc and a center point of the fourth arc.

The center point of an arc designates the center point of the associated circle, i.e. the circle of which the arc forms an extract. The corner points of the arcs are the points on the circle which are connected together by the arc and delimit the arc towards the outside. The corner points are distinguished in that further points of the arc do not lie on both sides of the respective corner point, but only on one side.

According to an embodiment of the invention, the first arc and its center point lie completely on different sides of the longitudinal sectional plane. Similarly, the second arc and its center point lie completely on different sides of the longitudinal sectional plane. This implies that the center point of the first arc and the center point of the second arc lie on the same side of the longitudinal sectional plane, and that similarly, the center point of the second arc and the first arc lie on the same side of the longitudinal sectional plane.

Because of the configuration of the arcs according to embodiments of the invention, the inner sliding surface has a non-circular form. This improves the load-bearing capacity and durability of the radial plain bearing.

In a preferred embodiment, the center point of the first arc and the center point of the second arc are mirror-symmetrical to one another. A mirror plane passes through the above-mentioned longitudinal sectional plane. Preferably, in addition, the entire cross section of the inner sliding surface, i.e. the curve of the inner sliding surface lying in the cross-sectional plane, is mirror-symmetrical to the same longitudinal sectional plane. In addition, an arrangement is preferred in which the three center points, i.e. the center point of the first arc, the center point of the second arc and the common center point of the third and fourth arcs, lie on a straight line passing through all three center points.

In a further preferred refinement, a radius of the first arc or its associated circle is greater than a radius of the third arc or its associated circle and than a radius of the fourth arc or its associated circle. In addition, preferably, a radius of the second arc or its associated circle is greater than the radius of the third arc and than the radius of the fourth arc. The radius of the third arc and the radius of the second arc preferably the same. Similarly, the radius of the third arc is preferably the same as the radius of the fourth arc.

The sliding surface is preferably configured as an inner sliding surface of a radial plain bearing. This has an outer sliding surface which forms a sliding surface pair with the inner sliding surface.

The radial plain bearing is preferably configured as part of a planetary gear stage. A planetary gear stage comprises a ring gear, a sun wheel, a planet carrier and at least one planet wheel. The latter is rotatably mounted on a planet pin which is fixed in the planet carrier. The at least one planet wheel meshes with the sun wheel and/or the ring gear. In the present case, the planet wheel is mounted on the planet pin by means of the radial plain bearing. This is advantageous since the loaded zone in the bearing of a planet wheel is static relative to the planet carrier. Similarly, the position of the inner sliding surface of the radial plain bearing is static relative to the planet carrier. Thus the form of the inner sliding surface is static relative to the loaded zone. By suitable orientation of the inner sliding surface relative to the loaded zone, an improved load-bearing capacity can be achieved.

In a preferred embodiment, the planet pin integrally forms the inner sliding surface of the radial plain bearing. Alternatively, the planet pin may have a bush which integrally forms the inner sliding surface. In this case, the planet pin consists of the bush and a base body on which the bush is fixed. The bush and the base body are pieces physically separated from one another. The outer sliding surface of the radial plain bearing is preferably formed integrally by a floating bush or the planet wheel.

The inner sliding surface according to an embodiment of the invention may be produced by means of a turning machine. A three-stage method is used in which a workpiece is re-clamped twice. The workpiece thus rotates about three different axes. A corresponding method according to an embodiment of the invention comprises the following steps:
  turning of the workpiece, wherein the workpiece rotates about an axis which runs through the center point of the first arc. A portion of the inner sliding surface which contains the first arc is thus produced.
  turning of the workpiece, wherein the workpiece rotates about an axis which runs through the center point of the second arc. A portion of the sliding surface which contains the second arc is produced in this step.
  turning of the workpiece, wherein the workpiece rotates about an axis which runs through the common center point of the third arc and the fourth arc. Two portions of the inner sliding surface are hereby produced—a portion which contains the third arc and a portion which contains the fourth arc.

The step of turning the workpiece about the axis running through the common center point of the third arc and the fourth arc is preferably carried out after the step of turning the workpiece about the axis which runs through the center point of the first arc and the step of turning the workpiece about the axis which runs through the center point of the second arc.

The sliding surface 101 shown in FIG. 1 has four arc corner points-a first corner point 103, a second corner point 105, a third corner point 107 and a fourth corner point 109. The sliding surface 101 in the sectional illustration is formed by a first arc 111, a second arc 113, a third arc 115 and a fourth arc 117. The first corner point 103 and the fourth corner point 109 are corner points of the first arc 111. The corner points of the second arc 113 are the second corner point 105 and the third corner point 107. The first corner point 103 and the second corner point 105 are corner points of the third arc 115. The third corner point 107 and the fourth corner point 109 are corner points of the fourth arc 117. Thus the first arc 111 and the third arc 115 meet one another at the first corner point 103. The third arc 117 and the second arc 113 meet one another at the second corner point 105. The second arc 113 and the fourth arc 117 meet one another at the third corner point 107. The fourth arc 117 and the first arc 111 meet one another at the fourth corner point 109.

The sliding surface 101 is mirror-symmetrical to a longitudinal section plane 119. The longitudinal sectional plane 119 runs orthogonally to a cross-sectional plane which corresponds to the illustration plane of FIG. 1.

The first arc 111 and a center point 121 of the first arc 111 lie on different sides of the longitudinal sectional plane 115. Furthermore, a center point 123 of the second arc 113 and the second arc 113 lie on different sides of the longitudinal section plane 119. Between the two center points 121, 123 lies a common center point 125 of the third arc 115 and the fourth arc 117. The common center point 125 is intersected by the longitudinal section plane 119. All three center points 121, 123, 125 also lie on a straight line which runs in the above-mentioned cross-sectional plane and is oriented orthogonally to the longitudinal sectional plane 119. Also, a rotational axis of a radial plain bearing, the inner sliding surface of which forms the sliding surface 101, runs through the common center point 125.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

101 Plain bearing
103 First corner point
105 Second corner point
107 Third corner point
109 Fourth corner point
111 First arc
113 Second arc
115 Third arc
117 Fourth arc
119 Longitudinal sectional plane
121 Centre point of the first arc
123 Centre point of second arc
125 Centre point of third arc and fourth arc

The invention claimed is:

1. An inner sliding surface for a radial plain bearing, comprising:
    four circle arcs in at least one cross section,
    wherein a first arc and a second arc of the four circle arcs lie on different sides of a longitudinal sectional plane which intersects a third arc of the four circle arcs, a fourth arc of the four circle arcs and a common center point of the third arc and the fourth arc,
    wherein the first arc and a center point of the first arc lie on different sides of the longitudinal sectional plane, and
    wherein the second arc and a center point of the second arc lie on different sides of the longitudinal sectional plane.

2. The inner sliding surface as claimed in claim 1, wherein the center point of the first arc and the center point of the second arc are mirror-symmetrical to one another with respect to the longitudinal sectional plane.

3. The inner sliding surface as claimed in claim 1, wherein a radius of the first arc is greater than a radius of the third arc and a radius of the fourth arc.

4. A radial plain bearing, comprising the inner sliding surface as claimed in claim 1, and a cylindrical outer sliding surface, wherein the inner sliding surface and the outer sliding surface form a sliding surface pair.

5. A planetary gear stage comprising at least one radial plain bearing as claimed in claim 4 and further comprising:
    at least one planet wheel; and
    at least one planet pin,
    wherein the planet wheel is mounted on the planet pin by means of the radial plain bearing.

6. The planetary gear stage as claimed in claim 5, wherein the planet pin integrally forms the inner sliding surface of the radial plain bearing.

7. A method for manufacturing a component with an inner sliding surface, the method comprising:
    turning a workpiece such that the workpiece rotates about an axis which runs through a center point of a first circle arc of the inner sliding surface;
    turning the workpiece such that the workpiece rotates about an axis which runs through a center point of a second circle arc of the inner sliding surface; and
    turning the workpiece such that the workpiece rotates about an axis which runs through a common center point of a third circle arc and a fourth circle arc of the inner sliding surface,
    wherein the first circle arc and the second circle arc lie on different sides of a longitudinal sectional plane which intersects the third circle arc, the fourth circle arc, and the common center point of the third and fourth circle arcs,
    wherein the first circle arc and the center point of the first circle arc lie on different sides of the longitudinal sectional plane, and
    wherein the second circle arc and the center point of the second circle arc lie on different sides of the longitudinal sectional plane.

8. The method according to claim 7, wherein the step of turning the workpiece such that the workpiece rotates about the axis which runs through the common center point is carried out after the steps of turning the workpiece such that the workpiece rotates about the axis which runs through the center point of the first circle arc and turning the workpiece such that the workpiece rotates about the axis which runs through the center point of the second circle arc.

* * * * *